United States Patent
Kim et al.

(10) Patent No.: US 11,544,198 B2
(45) Date of Patent: Jan. 3, 2023

(54) DATA STORAGE DEVICE EMPLOYING CACHING GROUPS DEFINED BY WRITE COUNTS OF DATA BLOCKS AND OPERATING METHOD THEREOF

(71) Applicant: SK hynix Inc., Icheon-si (KR)

(72) Inventors: So Hyun Kim, Icheon-si (KR); Kyung Soo Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 44 days.

(21) Appl. No.: 17/196,909

(22) Filed: Mar. 9, 2021

(65) Prior Publication Data
US 2022/0164292 A1 May 26, 2022

(30) Foreign Application Priority Data
Nov. 26, 2020 (KR) .......................... 10-2020-0160677

(51) Int. Cl.
*G06F 12/0888* (2016.01)
*G06F 12/1009* (2016.01)

(52) U.S. Cl.
CPC ...... *G06F 12/0888* (2013.01); *G06F 12/1009* (2013.01); *G06F 2212/601* (2013.01)

(58) Field of Classification Search
CPC combination set(s) only.
See application file for complete search history.

(56) References Cited

U.S. PATENT DOCUMENTS

| | | | |
|---|---|---|---|
| 11,126,573 B1 * | 9/2021 | Rohleder | G06F 13/1668 |
| 2014/0164681 A1 * | 6/2014 | Ravimohan | G06F 3/0679 |
| | | | 711/103 |
| 2014/0281161 A1 * | 9/2014 | Chen | G06F 13/161 |
| | | | 711/103 |

FOREIGN PATENT DOCUMENTS

| | | |
|---|---|---|
| KR | 1020150037364 A | 4/2015 |
| KR | 1020180134119 A | 12/2018 |

OTHER PUBLICATIONS

Carter, John, et al. "Impulse: Building a smarter memory controller." Proceedings Fifth International Symposium on High-Performance Computer Architecture. IEEE, 1999. (Year: 1999).*

* cited by examiner

*Primary Examiner* — Charles Rones
*Assistant Examiner* — Hewy H Li
(74) *Attorney, Agent, or Firm* — Perkins Coie LLP

(57) ABSTRACT

A data storage device may include a first memory apparatus including a plurality of data blocks having data classified in units of data blocks; a second memory apparatus in communication with the first memory apparatus to store data cached from the first memory apparatus; and a controller in communication with the first memory apparatus and the second memory apparatus. The controller is configured to perform a caching group based caching operation by controlling the first memory apparatus to cache data from the first memory apparatus to the second memory apparatus on a caching group basis. Each caching group includes a first data block requested for caching and one or more other data blocks having the same write count as a write count of the first data block.

20 Claims, 10 Drawing Sheets

DATA STORAGE DEVICE EMPLOYING CACHING GROUPS DEFINED BY WRITE COUNTS OF DATA BLOCKS AND OPERATING METHOD THEREOF

CROSS-REFERENCES TO RELATED APPLICATION

This patent document claims the priority and benefits of Korean application number 10-2020-0160677, filed on Nov. 26, 2020, which is incorporated herein by reference in its entirety as part of the disclosure of this patent document.

TECHNICAL FIELD

The technology and implementations disclosed in this patent document generally relate to a semiconductor apparatus.

BACKGROUND

In storing and retrieving data, a host system that is accessing a data storage device to read or write data from or to the data storage device can use a cache memory to reduce the average time to access a main memory area in the data storage device.

Upon receiving a read command from the host system, a cache memory, which is faster than the main memory area in terms of the read operation speed, can hold data fetched from the memory space of the data storage device before providing the data to the host system.

With the increase in the amount of data that host systems need to handle, the read and write speed has become the most important factor in improving the performance of the host systems Therefore, efficient utilization of the cache memory is of great importance and requires an optimal and intelligent strategy.

SUMMARY

The technology disclosed in this patent document can be implemented in various embodiments to provide a data storage device with improved data processing performance and an operating method thereof.

In an embodiment, a data storage device may include: a first memory apparatus including a plurality of data blocks having data classified in units of data blocks; a second memory apparatus in communication with the first memory apparatus to store data cached from the first memory apparatus; and a controller in communication with the first memory apparatus and the second memory apparatus and configured to control the first memory apparatus with respect to data stored in the first memory apparatus to be cached in the second memory apparatus in units of caching groups, wherein the controller is configured to perform a caching group based caching operation by controlling the first memory apparatus to cache data from the first memory apparatus in the second memory apparatus on a caching group basis, and each caching group includes a first data block requested for caching and one or more other data blocks having the same write count as a write count of the first data block.

In another embodiment, an operating method of a data storage device may include steps of: checking a write count of each of a plurality of data blocks in a first memory apparatus; setting, as a first bit value, a bit value corresponding to each start position of consecutive data blocks having the same write count as each other, in a bitmap having the same size as the number of the plurality of data blocks; forming a plurality of caching groups each including one or more data blocks by using the first bit value; and caching data stored in the first memory apparatus to a second memory apparatus on a caching group basis, each including a first data block requested for caching and one or more data blocks having the same write count as a write count of the first data block, among the plurality of caching groups.

In another embodiment, a data storage device may include: a first memory apparatus configured to group data into data blocks to store the data on a data block basis; a second memory apparatus in communication with the first memory apparatus to store data cached from the first memory apparatus; and a controller in communication with the first memory apparatus and the second memory apparatus and configured to: check a write count of each of a plurality of data blocks in the first memory apparatus; form a plurality of caching groups each including consecutive data blocks having the same write count as each other as a result of the check; select a caching group to be cached from the plurality of formed caching groups in the order of the write count from highest to lowest; and control data in the selected caching group to be cached in the second memory apparatus, wherein a size of each of the plurality of caching groups is larger than or equal to a size of a single data block.

In another embodiment, a data storage device may include: a first memory apparatus including a plurality of data blocks having data classified in units of data blocks; a second memory apparatus configured to store data cached from the first memory apparatus; and a controller configured to control data stored in the first memory apparatus to be cached in the second memory apparatus in units of caching groups each including a first data block required to be cached and one or more data blocks having substantially the same write count as a write count of the first data block.

In another embodiment, an operating method of a data storage device may include steps of: checking a write count of each of a plurality of data blocks in a first memory apparatus; setting, as a first bit value, a bit value, which corresponds to each start position of one or more consecutive data blocks having substantially the same write count, in a bitmap having substantially the same size as the number of the plurality of data blocks; forming a plurality of caching groups each including one or more data blocks by using the first bit value; and caching data stored in the first memory apparatus to a second memory apparatus in units of caching groups, each including a first data block required to be cached and one or more data blocks having substantially the same write count as a write count of the first data block, among the plurality of caching groups.

In another embodiment, a data storage device may include: a first memory apparatus configured to classify and store data in units of data blocks; a second memory apparatus configured to store data cached from the first memory apparatus; and a controller configured to check a write count of each of a plurality of data blocks in the first memory apparatus, to form a plurality of caching groups each including one or more consecutive data blocks having substantially the same write count as a result of the check, to select a caching group to be cached from the plurality of formed caching groups on the basis of an order in which the write count is high, and to control data in the selected caching group to be cached in the second memory apparatus, wherein a size of each of the plurality of caching groups is larger than or equal to a size of a single data block.

In another embodiment, a data storage device may include a first memory apparatus including a plurality of data blocks configured to store data, a second memory apparatus in communication with the first memory apparatus to store data cached from the first memory apparatus, and a controller in communication with the first memory apparatus and the second memory apparatus and configured to control the first memory apparatus with respect to data stored in the first memory apparatus to be cached in the second memory apparatus in units of caching groups, wherein the controller is configured to perform a caching group based caching operation by controlling the first memory apparatus to cache data from the first memory apparatus in the second memory apparatus on a caching group basis, and each caching group includes a first data block requested for caching and one or more other data blocks having the same write count as a write count of the first data block.

DETAILED DESCRIPTION

Hereinafter, preferred embodiments of the present disclosure will be described with reference to the accompanying drawings.

Figure 1:
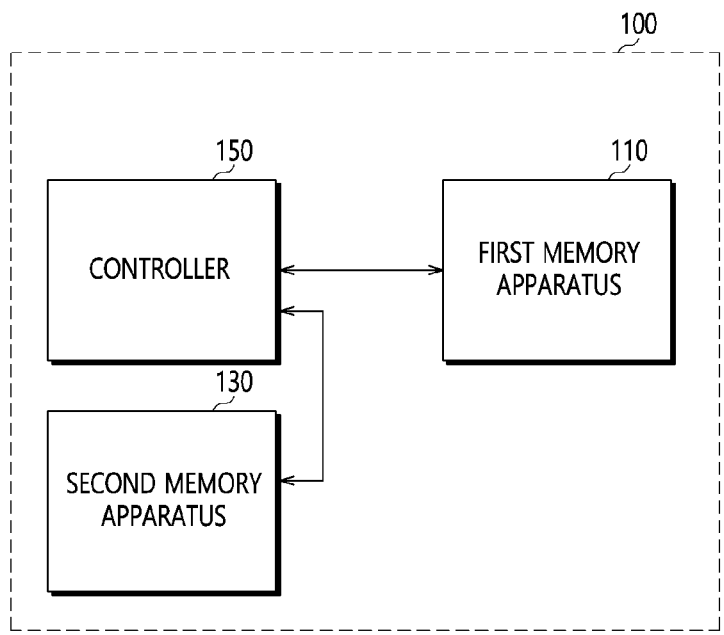
FIG. 1 is a diagram illustrating an example of a data storage device based on an embodiment of the disclosed technology.
Figure 2:
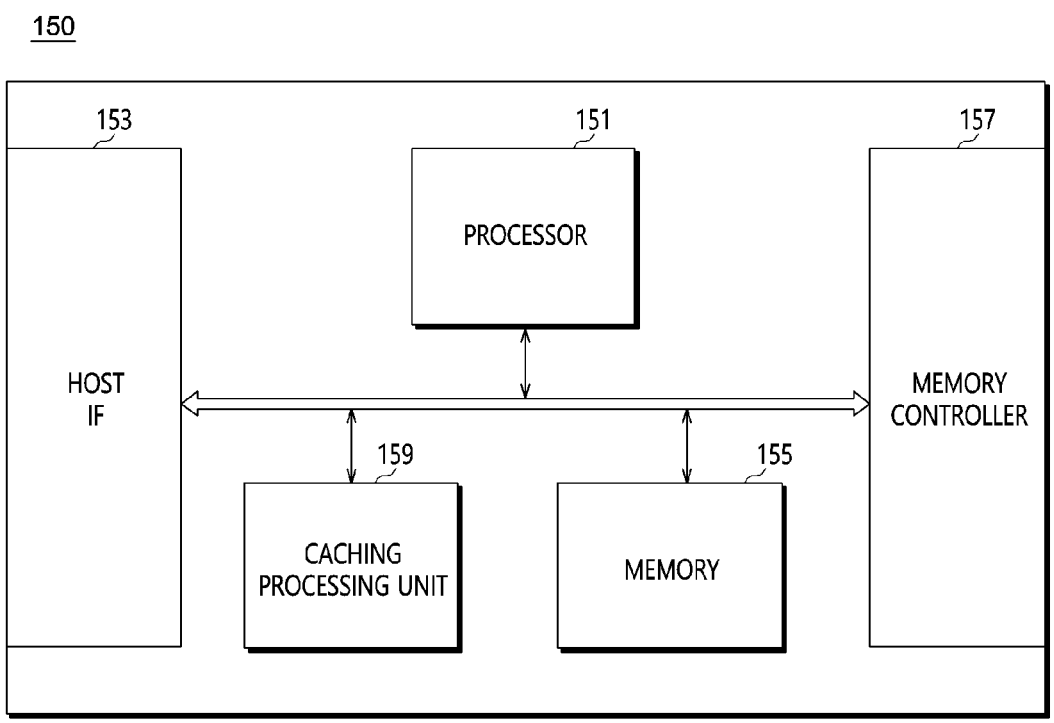
FIG. 2 is a diagram illustrating an example of a controller based on an embodiment of the disclosed technology.

FIG. 1 is a diagram illustrating an example of a data storage device 100 based on an embodiment of the disclosed technology, and FIG. 2 is a diagram illustrating an example of a controller 150 in accordance with an embodiment of the disclosed technology.

Referring to FIG. 1, the data storage device 100 may include a first memory apparatus 110, a second memory apparatus 130, and the controller 150.

The first memory apparatus 110 may group data into data blocks and store the data in units of data blocks.

Specifically, the first memory apparatus 110 may be composed of a plurality of data blocks having data in units of data blocks. The data block may indicate a minimum caching unit by which the data may be cached in the second memory apparatus 130. In the present embodiment, unlike another implementation where caching is performed in units of a fixed single data block, caching may be performed in units of caching groups so as to include one or more data blocks according to a write count, which will be described in detail below. The first memory apparatus 110 may include a plurality of ranks, like the second memory apparatus 130 to be described below. Each of the plurality of ranks may include a plurality of banks each configured to store data. Such a structure is substantially the same as that of the second memory apparatus 130, which will be described in detail below.

The first memory apparatus 110 may be implemented as a storage class memory (SCM), and the present disclosure is not limited thereto. The first memory apparatus 110 may be a storage medium that has a nonvolatile characteristic like a flash memory and supports a high speed like a synchronous dynamic random access memory (SDRAM).

The first memory apparatus 110 may have a longer access waiting time than the second memory apparatus 130. Accordingly, in the present embodiment, some of data stored in the first memory apparatus 110 may be cached in the second memory apparatus 130, thereby quickly returning data in response to a read command from a host.

Figures 3, 4A:
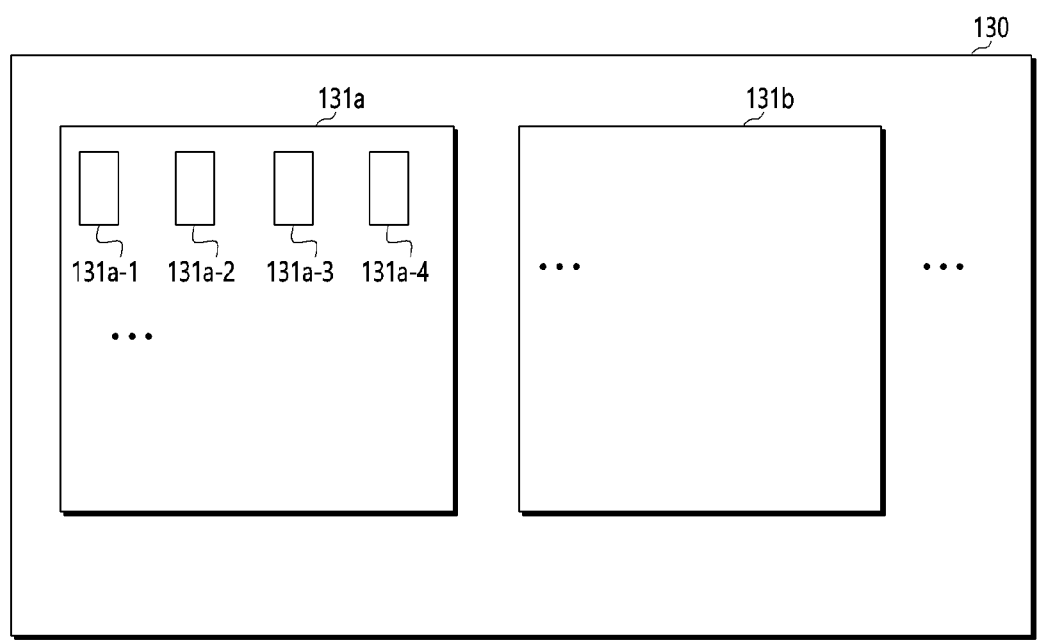
FIG. 3 is a diagram illustrating an example of a second memory apparatus based on an embodiment of the disclosed technology.
FIGS. 4a-4b are diagrams for explaining a method of generating a caching group based on an embodiment of the disclosed technology.

FIG. 3 is a diagram illustrating an example of the second memory apparatus 130 based on an embodiment of the disclosed technology.

The second memory apparatus 130 may store data cached from the first memory apparatus 110.

In the present embodiment, when the read command is received from the host, the second memory apparatus 130 may be a memory apparatus that is accessed before the first memory apparatus 110 in order to check whether corresponding data exist.

Referring to FIG. 3, the second memory apparatus 130 may include a plurality of ranks 131a, 131b, . . . . Each of the plurality of ranks 131a, 131b, . . . may include a plurality of banks (e.g., 131a-1, 131a-2, 131a-3, 131a-4, . . . ) configured to store data. Such a structure of the second memory apparatus 130 may also be applied to the first memory apparatus 110 in the same manner.

Accordingly, the physical address of the first or second memory apparatus 110 or 130 may include the ranks 131a, 131b, . . . , the banks (e.g., 131a-1, 131a-2, 131a-3, 131a-4, . . . ), a row, and a column. In such a case, the row may indicate row information in the banks (e.g., 131a-1, 131a-2, 131a-3, 131a-4, . . . ), and the column may indicate column information in the banks (e.g., 131a-1, 131a-2, 131a-3, 131a-4, . . . ).

For example, the physical address of the first or second memory apparatus 110 or 130 may be in the form of (01)(001)(1110001100110100)(01101111101) as rank (2): bank (3):row (16):col (11). That is, the 16-row and 11-column in the third bank in the second rank among the plurality of ranks may be the physical address.

The second memory apparatus 130 may be implemented as a dynamic random access memory (DRAM) and the present disclosure is not limited thereto.

The second memory apparatus 130 may have a shorter access waiting time than the first memory apparatus 110. Furthermore, the second memory apparatus 130 may have relatively good accessibility because a physical distance from the controller 150 is shorter than that of the first memory apparatus 110.

The controller 150 may group data stored in the first memory apparatus 110 into data blocks, form a plurality of caching groups each including one or more data blocks, and control data in a caching group selected in the order of a write count from highest to lowest, among the plurality of caching groups to be cached in the second memory apparatus 130.

In other implementations, whenever data write to the first memory apparatus 110 occurs, the controller 150 caches written data to the second memory apparatus 130. Therefore, a large amount of data that are not frequently used but stored unnecessarily may exist in the second memory apparatus 130. In the present embodiment, when data of the first memory apparatus 110 is cached in the second memory apparatus 130, since a caching target is selected in the order of a write count from highest to lowest, the second memory apparatus 130 may store relatively frequently used data (for example, hot data). Accordingly, it is possible to expect an effect of improving a read hit ratio of data stored in the second memory apparatus 130. In this patent document, the term "hot data" can be used to indicate data that is frequently accessed.

The size of each of the caching groups may be larger than or equal to the size of a single data block. In such a case, the single data block indicates a minimum caching unit. In other implementations, since a unit to be cached at a time is the single data block, it is not possible to guarantee a data caching speed and data continuity. In the present embodiment, caching groups each including one or more data blocks are formed and caching to the second memory apparatus 130 is performed in units of caching groups. Therefore, it is possible to expect an effect of improving a caching speed and guaranteeing data continuity.

Referring to FIG. 2, the controller 150 in accordance with an embodiment may include a processor 151, a host I/F 153, a memory 155, a memory controller 157, and a caching processing unit 159.

The processor 151 may include instructions used to perform an operation in response to a request of the host (not illustrated).

The second memory apparatus 130 may include a memory circuit such as DRAM and control circuits for processing access to data stored in the memory circuit. The second memory apparatus 130 may be logically and physically located relatively close to the processor 151 and thus operate at a relatively high speed.

When the read command is received from the host, the processor 151 may search for a mapping table by using a logical address included in the read command, and check whether caching has been performed according to the presence or absence of the physical address of the second memory apparatus 130 matching the logical address as a result of the search. The mapping table may be generated by caching data in a caching group to the second memory apparatus 130 and then matching logical addresses for the cached data, the physical address of the first memory apparatus 110, and the physical address of the second memory apparatus 130. The mapping table may be stored in the second memory apparatus 130.

When the physical address of the second memory apparatus 130 matching the logical address exists in the mapping table, the processor 151 may acquire data corresponding to the physical address of the second memory apparatus 130 from the second memory apparatus 130, and return the acquired data to the host.

When returning the data to the host, the processor 151 may return the data in units of caching groups. Since the size of the caching group disclosed in the present embodiment is equal to or larger than the size of the single data block, it is possible to improve the continuity of data corresponding to a workload that needs to be operated at a time in the host.

When the remaining memory space of the second memory apparatus 130 is equal to or less than a reference value, the processor 151 may evict data stored in the second memory apparatus 130. The processor 151 may control the first memory apparatus 110 to cache data of a caching group in the first memory apparatus 110, which has substantially the same size as that of the evicted data, to the second memory apparatus 130.

In such a case, the processor 151 may re-store or not store the data evicted from the second memory apparatus 130 in the first memory apparatus 110 according to the caching method of the first memory apparatus 110. For example, when the first memory apparatus 110 caches data to the second memory apparatus 130 and then the data are not stored in the first memory apparatus 110, the data evicted from the second memory apparatus 130 may be re-stored in the first memory apparatus 110. On the contrary, when the first memory apparatus 110 caches data to the second memory apparatus 130 and then the data are stored in the first memory apparatus 110 as is, the data evicted from the second memory apparatus 130 may not be re-stored in the first memory apparatus 110.

The host I/F 153 may provide a communication channel for receiving a command and a clock signal from the host and controlling data input/output under the control of the processor 151. Particularly, the host I/F 153 may provide a physical connection between the host and the data storage device 100. Furthermore, the host I/F 153 may provide interfacing with the data storage device 100 according to the bus format of the host. The bus format of the host may include at least one of standard interface protocols such as a secure digital, a universal serial bus (USB), a multi-media card (MMC), an embedded MMC (eMMC), a personal computer memory card international association (PCM-CIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and a universal flash storage (UFS).

The memory 155 may include a ROM capable of storing program codes necessary for the operation of the controller 150, for example, firmware or software, and code data and the like used by the program codes, and a RAM, as a main memory, capable of storing data necessary for the operation of the controller 150 or data generated by the controller 150.

The memory controller 157 may provide a communication channel for signal transmission/reception between the controller 150 and the first and second memory apparatuses 110 and 130. Although not illustrated, the memory controller 157 may separately provide a communication channel with the first memory apparatus 110 and provide a communication channel with the second memory apparatus 130.

The memory controller 157 may write input data of the host in the first memory apparatus 110 under the control of the processor 151. Furthermore, the memory controller 157 may provide the host with data read from the first memory apparatus 110.

As an example, the caching processing unit 159 may control data stored in the first memory apparatus 110 to be cached in the second memory apparatus 130 in units of caching groups each including a first data block required to be cached and at least more data blocks having substantially the same write count as that of the first data block. The first data block is a data block stored in the first memory apparatus 110 and refers to a data block to be cached in the second memory apparatus 130.

The caching processing unit 159 may check a write count of each of the plurality of data blocks, set, as a first bit value, a bit value, which corresponds to each start position of the one or more consecutive data blocks having substantially the same write count, in a bitmap having substantially the same size as the number of the plurality of data blocks, and determine respective intervals between the first bit values of the bitmap as the sizes of the caching groups.

The caching processing unit 159 may form a plurality of caching groups on the basis of the first bit value.

The caching processing unit 159 may cache data in a caching group, which includes the first data block required to be cached among the plurality of caching groups, to the second memory apparatus 130.

The size of each of the plurality of caching groups may be larger than or equal to that of the single data block. The caching processing unit 159 may check the write count of each of the plurality of data blocks in the first memory apparatus 110, change a bit value corresponding to a second data block to the first bit value when a write count of the second data block is different from a write count of a third data block, which is an immediately preceding data block of the second data block, in the plurality of checked data blocks, and form a caching group including data blocks being consecutive from a data block corresponding to the first bit value and having substantially the same write count. The first bit value indicates a preset specific bit value, and may serve as a delimiter that indicating the first data block of a corresponding caching group. That is, the first bit value may be a criterion indicating a boundary between caching groups. For example, when the bitmap is 1000100 and the first bit value is 1, units of the first bit value may be 1000 and 100. That is, the bitmap 1000100 may be discriminated by two units 1000 and 100 of the first bit value.

The caching processing unit 159 may select a caching group, which includes the first data block required to be cached, from the plurality of caching groups, in the order of the write count from highest to lowest, and control data in the selected caching group to be cached in the second memory apparatus 130.

As another example, the caching processing unit 159 may check the write count of each of the plurality of data blocks in the first memory apparatus 110, form a plurality of caching groups each including one or more consecutive data blocks having substantially the same write count as a result of the check, select a caching group to be cached, from the plurality of caching groups, in the order of the write count from highest to lowest, and control data in the selected caching group to be cached in the second memory apparatus 130. In such a case, the size of each of the plurality of caching groups may be larger than or equal to the size of the single data block.

The caching processing unit 159 may set, as a first bit value, a bit value, which corresponds to each start position of one or more consecutive data blocks having substantially the same write count, in a bitmap having substantially the same size as the number of the plurality of data blocks, and form the plurality of caching groups each including one or more data blocks by using the first bit value.

Figure 4B:
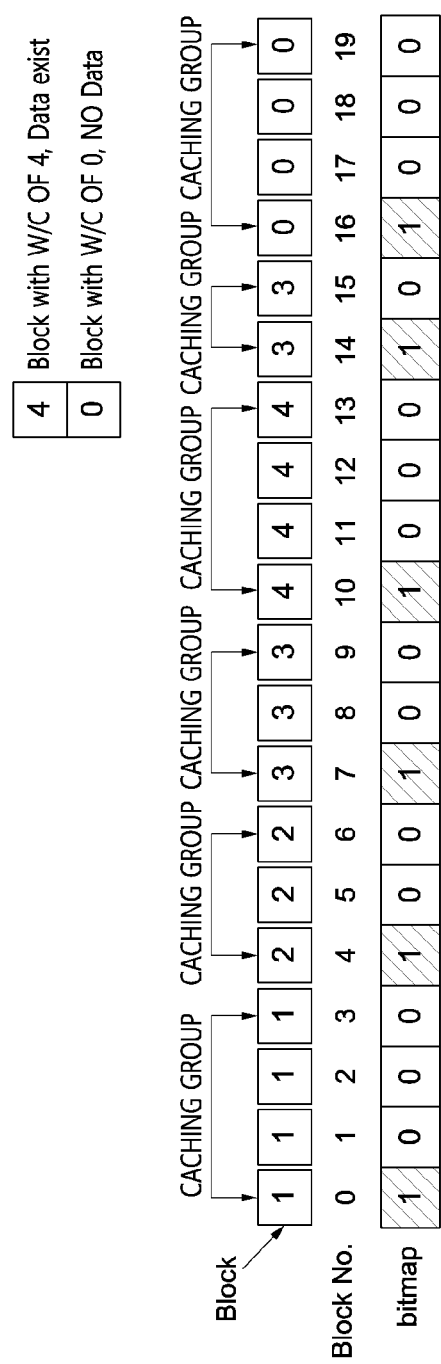
Figure 5:
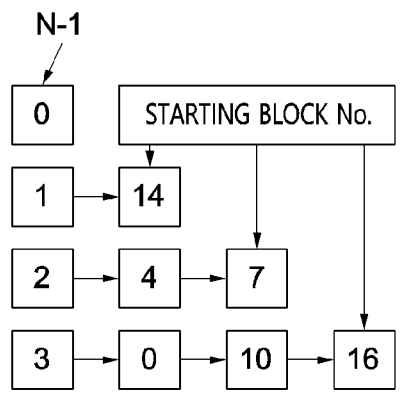
FIG. 5 is a diagram for explaining a method of generating a caching group based on an embodiment of the disclosed technology.

FIG. 4*a*, FIG. 4*b*, and FIG. 5 are diagrams for explaining a method of generating a caching group based on an embodiment of the disclosed technology.

Referring to FIG. 4*a*, the caching processing unit 159 may set an initial bitmap by setting a bit value, which corresponds to the first data block of the plurality of data blocks, to 1, and setting bit values, which correspond to the second data block to the last data block of the plurality of data blocks, to 0. For example, when the number of data blocks 0 to 19 is 20, the initial bitmap may be 10000000000000000000.

As illustrated in FIG. 4*a* and FIG. 4*b*, the bitmap may be formed corresponding to each of the plurality of data blocks.

As will be described below, when changing the bit value, the caching processing unit 159 may change a bit value for each of the plurality of data blocks on the basis of the initial bitmap.

Referring to FIG. 4*b*, the caching processing unit 159 may recognize the write count of data block 0 as 1, the write count of data block 1 as 1, the write count of data block 2 as 1, the write count of data block 3 as 1, the write count of data block 4 as 2, the write count of data block 5 as 2, the write count of data block 6 as 2, the write count of data block 7 as 3, the write count of data block 8 as 3, the write count of data block 9 as 3, the write count of data block 10 as 4, the write count of data block 11 as 4, the write count of data block 12 as 4, the write count of data block 13 as 4, the write count of data block 14 as 3, the write count of data block 15 as 3, the write count of data block 16 as 0, the write count of data block 17 as 0, the write count of data block 18 as 0, and the write count of data block 19 as 0.

Referring to FIG. 4*b*, in the data blocks 0 to 19, when the write count of the second data block as the current data block is different from the write count of the third data block as an immediately preceding data block, the caching processing unit 159 may change a bit value corresponding to the second data block. In such a case, the caching processing unit 159 may change the bit value by using the initial bitmap corresponding to the data blocks. For example, since the data block 0 (block No. 0 in FIG. 4*b*) has an initial bit value of 1 and has no immediately preceding data block, the data block 0 may substantially maintain the initial bit value. Since the data block 1 has the write count of 1, which is substantially the same as the write count of 1 of the immediately preceding data block, the data block 1 may substantially maintain the initial bit value of 0 as is. Since the data block 4 has the write count of 2, which is different from the write count of 1 of the data block 3 as an immediately preceding data block, the caching processing unit 159 may change the initial bit value of 0 to 1. In this way, the caching processing unit 159 may set bit values for all of the plurality of data blocks.

Referring to FIG. 4*b*, the caching processing unit 159 may form, as respective caching groups, the data blocks 0 to 3, the data blocks 4 to 6, the data blocks 7 to 9, the data blocks 10 to 13, the data blocks 14 and 15, and the data blocks 16 to 19, which are consecutive data blocks in units of a specific bit value (first bit value) in the plurality of data blocks 0 to 19. The specific bit value may be 1. That is, the caching processing unit 159 may form caching groups each including consecutive data blocks using the bit value of 1 as a start reference.

The caching processing unit 159 may form caching groups before performing caching to the second memory apparatus 130. That is, since the write count for each of the plurality of data blocks may be changed continuously, the caching processing unit 159 forms caching groups before performing the caching to form caching groups in which the latest write counts for data blocks have been reflected.

Since the caching groups are formed as discussed above, the size of each of the plurality of caching groups may be determined based on the number of consecutive data blocks having substantially the same write count in the present embodiment. In the present embodiment, since the caching group is composed of consecutive data blocks having substantially the same write count, the caching group may include sequential data that need to be operated at a time in the host. Accordingly, the host may receive data in units of caching groups as a response to a read count and thus the data continuity may be guaranteed.

The caching processing unit 159 may generate and manage a caching group information list including at least one write count for each caching group, a size for each caching group, and starting block information for each caching group.

Referring to FIG. 5, the caching group information list may be generated by matching a starting block number corresponding to the size for each caching group; however, the present disclosure is not limited thereto. In FIG. 5, the size for each caching group is indicated by N−1; however, the present disclosure is not limited thereto. For example, a caching group having a caching group size of 1 may not exist, the starting block number of a caching group having a caching group size of 2 may be 14, the starting block numbers of a caching group having a caching group size of 3 may be 4 and 7, and the starting block numbers of a caching group having a caching group size of 4 may be 10 and 16.

Although not illustrated, in some implementations, each caching group in the caching group information list may store write counts by matching them.

The caching group information list may be used to select a caching group to be cached from the first memory apparatus 110 to the second memory apparatus 130, thereby enabling a caching process to be quickly performed.

Figure 6:
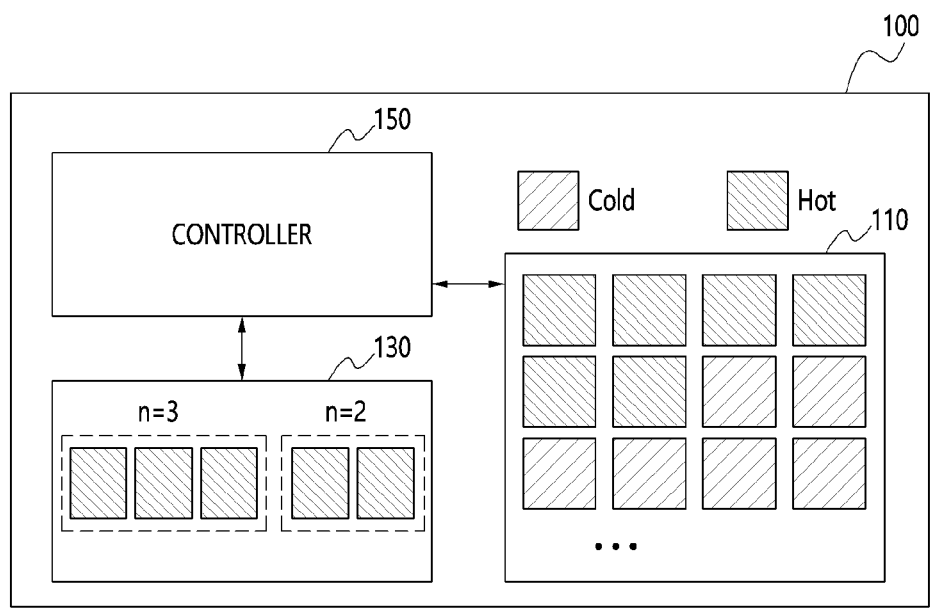
FIG. 6 is a diagram for explaining a caching method based on an embodiment of the disclosed technology.

FIG. 6 is a diagram for explaining a caching method based on an embodiment of the disclosed technology.

The caching processing unit 159 may select a caching group to be cached from the plurality of caching groups in the order of the write count from highest to lowest. Referring to FIG. 6, data blocks having a high write count are in a hot state as compared with other data blocks, and a caching group including the data blocks in such a state may be cached in the second memory apparatus 130. In this patent document, the term "hot state" can be used to indicate the state of data that is frequently accessed.

The caching processing unit 159 may cache data in the caching group to the second memory apparatus 130, and then generate the mapping table by matching logical addresses for the cached data, the physical address of the first memory apparatus 110, and the physical address of the second memory apparatus 130.

The mapping table may be stored in the second memory apparatus 130 and may be used when a read command and the like received from the host is processed.

The physical address of the first or second memory apparatus 110 or 130 described above may include the ranks (e.g., 131*a*, 131*b*, . . . ), the banks (e.g., 131*a*-1, 131*a*-2, 131*a*-3, 131*a*-4, . . . ), the row, and the column. For example, the physical address of the first or second memory apparatus 110 or 130 may be in the form of (01)(001) (1110001100110100)(01101111101) as rank (2):bank (3): row (16):col (11).

When receiving a caching request transmitted from the processor 151 due to an eviction of data in the second memory apparatus 130, the caching processing unit 159 may select a caching group in the first memory apparatus 110, which has substantially the same size as those of the evicted data and cache data in the selected caching group to the second memory apparatus 130. In such a case, the caching request transmitted from the processor 151 may include the sizes of the evicted data.

Figure 7:
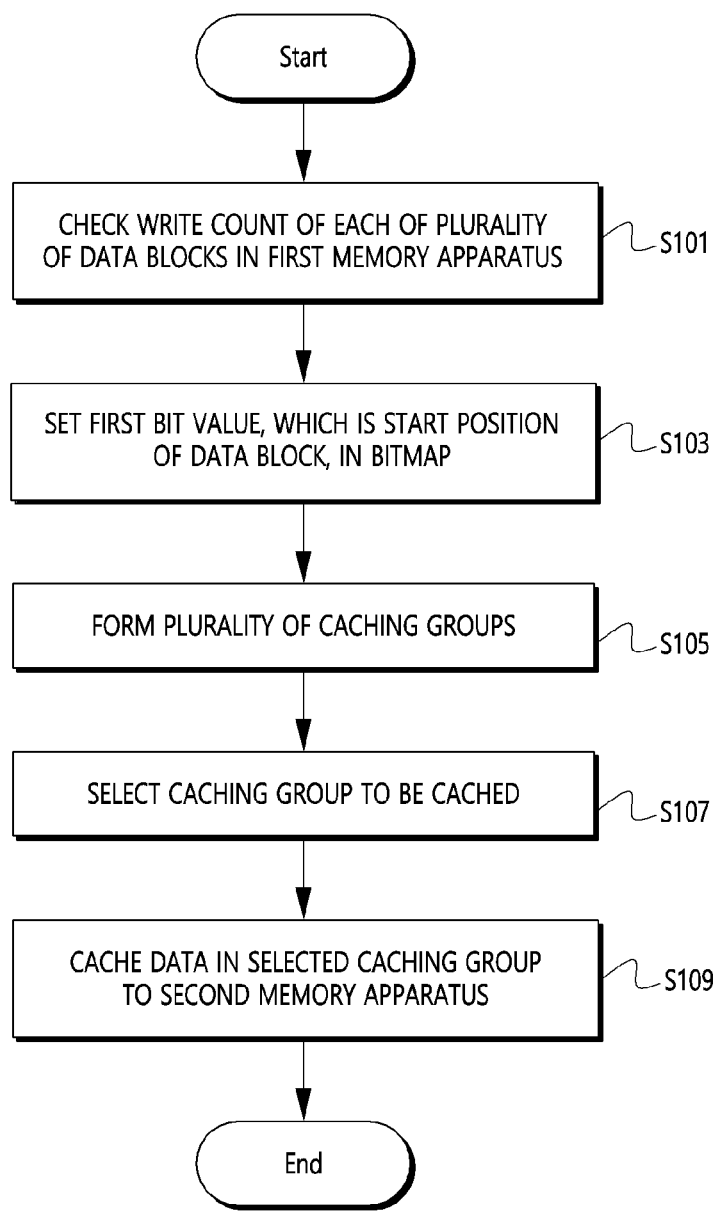
FIG. 7 is a flowchart for explaining an example of an operating method of the data storage device based on an embodiment of the disclosed technology.

FIG. 7 is a flowchart for explaining an example of an operating method of the data storage device 100 based on an embodiment of the disclosed technology.

First, the data storage device 100 may check the write count of each of the plurality of data blocks in the first memory apparatus 110 (S101).

The write count check for the data blocks may be performed whenever a data write occurs in the first memory apparatus 110.

The data storage device 100 may set, as a first bit value, a bit value, which corresponds to each start position of one or more consecutive data blocks having substantially the same write count, in the bitmap having substantially the same size as the number of the plurality of data blocks (S103).

In step S103, the data storage device 100 may set an initial bitmap by setting a bit value, which corresponds to the first data block of the plurality of data blocks, to 1 and by setting bit values, which correspond to the second data block to the last data block, to 0.

As will be described below, when changing the bit value for the second data block, the data storage device 100 may change a bit value for each of the plurality of data blocks on the basis of the initial bitmap.

The data storage device 100 may check whether the write count of the second data block is substantially the same as that of the third data block as an immediately preceding data block of the second data block in the plurality of data blocks. As a result of the check, when the write counts are not substantially the same, the data storage device 100 may change the bit value corresponding to the second data block to the first bit value. When changing the bit value of the second data block, the data storage device 100 may change the bit value for the second data block in the plurality of data blocks on the basis of the initial bitmap.

The data storage device 100 may form a plurality of caching groups each including one or more data blocks by using the first bit value (S105). The plurality of caching groups may be formed before data is cached in the second memory apparatus 130. Accordingly, the caching group in a state in which the latest write count for each data block has been reflected may be formed.

On the basis of the write count check result, the data storage device 100 may form the caching group including consecutive data blocks having substantially the same write count.

Specifically, the data storage device 100 may form the caching group including data blocks being consecutive from a data block corresponding to the first bit value in the plurality of data blocks and having substantially the same write count.

The data storage device 100 may cache data stored in the first memory apparatus 110 to the second memory apparatus 130 in units of caching groups each including the first data block required to be cached and at least more data blocks having substantially the same write count as that of the first data block among the plurality of caching groups (S107 and S109).

Specifically, the data storage device 100 may select a caching group to be cached, which includes the first data block required to be cached, from the plurality of caching groups, in the order of the write count from high to lowest (S107).

As illustrated in FIG. 5, the data storage device 100 may generate and manage the caching group information list including at least one write count for each caching group, a size for each caching group, and starting block information for each caching group.

The data storage device 100 may cache data in the selected caching group to the second memory apparatus 130 (S109).

Although not illustrated, the data storage device 100 may generate the mapping table by caching the data to the second memory apparatus 130 and then matching logical addresses for the cached data, the physical address of the first memory apparatus 110, and the physical address of the second memory apparatus 130.

Although not illustrated, when the remaining memory space of the second memory apparatus 130 is equal to or less than a reference value, the data storage device 100 may evict data stored in the second memory apparatus 130. The data storage device 100 may cache a caching group in the first memory apparatus 110, which has substantially the same size as that of the evicted data, to the second memory apparatus 130.

Figure 8:
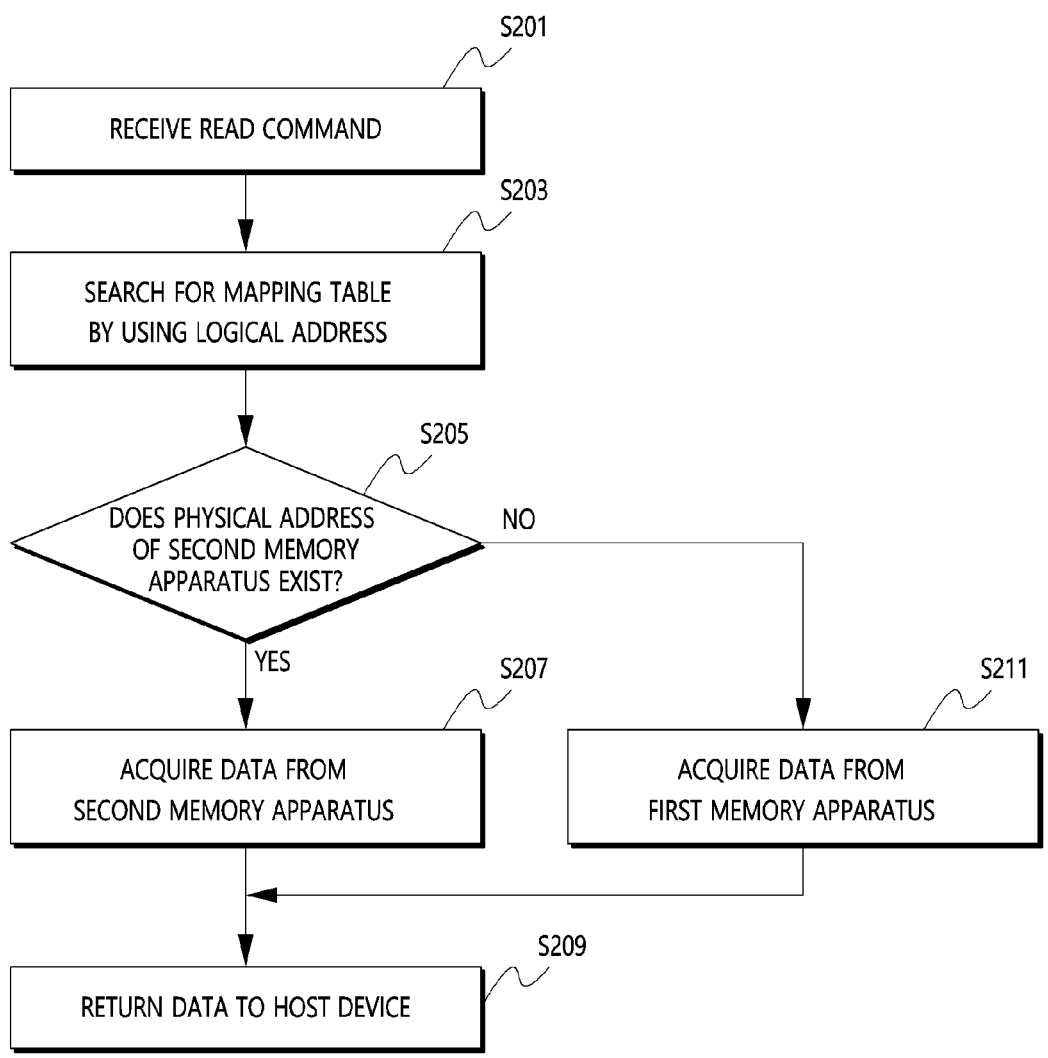
FIG. 8 is a flowchart for explaining another example of the operating method of the data storage device based on an embodiment of the disclosed technology.

FIG. 8 is a flowchart for explaining another example of the operating method of the data storage device 100 based on an embodiment of the disclosed technology.

The operating method of the data storage device 100 to be disclosed below will be described using a process, which is performed after data are cached in the second memory apparatus 130 of FIG. 7, as an example.

When a read command is received from the host (S201), the data storage device 100 may search for the mapping table by using a logical address included in the read command (S203).

In such a case, the mapping table may be generated by caching data in a caching group to the second memory apparatus 130 and then matching logical addresses for the cached data, the physical address of the first memory apparatus 110, and the physical address of the second memory apparatus 130.

The data storage device 100 may check whether caching has been performed, according to the presence or absence of the physical address of the second memory apparatus 130 matching the logical address as a result of the search.

Specifically, the data storage device 100 may check the presence or absence of the physical address of the second memory apparatus 130 matching the logical address as the result of the search (S205).

As a result of the check, when the physical address of the second memory apparatus 130 matching the logical address exists in the mapping table, the data storage device 100 may acquire data corresponding to the physical address of the second memory apparatus 130 from the second memory apparatus 130 (S207).

The data storage device 100 may return the acquired data to the host (S209). In such a case, the data may be returned to the host in units of caching groups. That is, the data is transmitted to the host in units of caching groups each including the plurality of data blocks of the data storage device 100.

As the result of the check of step S205, when the physical address of the second memory apparatus 130 matching the logical address does not exist in the mapping table, the data storage device 100 may check the physical address of the first memory apparatus 110 matching the logical address by referring to the mapping table, and acquire corresponding data from the first memory apparatus 110 on the basis of the checked physical address (S211). The data storage device 100 may perform step S209 of returning the acquired data to the host.

Figure 9:
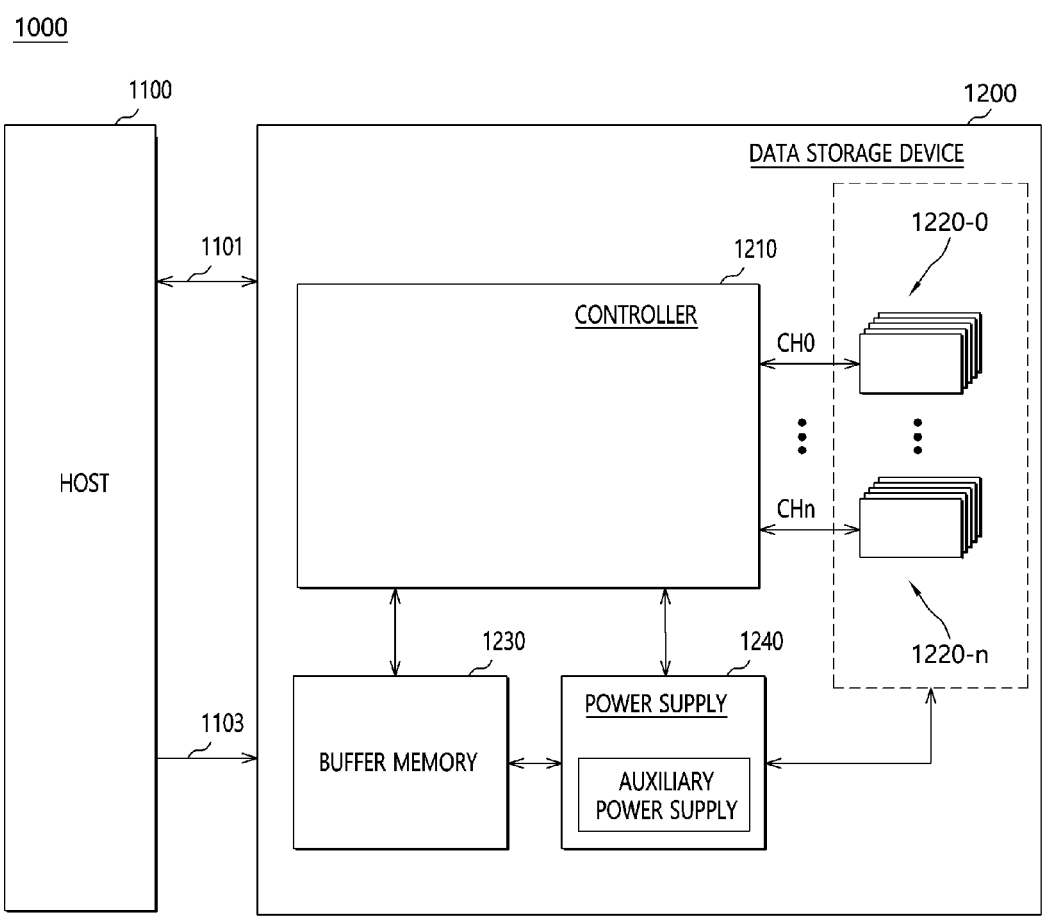
FIG. 9 is a configuration diagram of a storage system based on an embodiment of the disclosed technology.

FIG. 9 is a configuration diagram of a storage system 1000 based on an embodiment of the disclosed technology.

Referring to FIG. 9, the storage system 1000 may include a host 1100 and a data storage device 1200. In an embodiment, the data storage device 1200 may be configured as a solid state drive (SSD).

The data storage device 1200 may include a controller 1210, nonvolatile memory apparatuses 1220-0 to 1220-*n*, a buffer memory 1230, a power supply 1240, a signal connector 1101, and a power connector 1103.

The controller 1210 may control the overall operation of the data storage device 1200. The controller 1210 may include a host interface unit, a control unit, a random access memory as a working memory, an error correction code (ECC) unit, and a memory interface unit. For example, the controller 1210 may be configured as the controller 150 illustrated in FIG. 1 to FIG. 3.

The host 1100 and the data storage device 1200 may transmit/receive signals through the signal connector 1101. The signals may include instructions, addresses, and data.

The controller 1210 may analyze and process signals inputted from the host 1100. The controller 1210 may control operations of background functional blocks according to firmware or software for driving the data storage device 1200.

The buffer memory 1230 may temporarily store data to be stored in the nonvolatile memory apparatuses 1220-0 to 1220-*n*. Furthermore, the buffer memory 1230 may temporarily store data read from the nonvolatile memory apparatuses 1220-0 to 1220-*n*. The data temporarily stored in the buffer memory 1230 may be transmitted to the host 1100 or the nonvolatile memory apparatuses 1220-0 to 1220-*n* under the control of the controller 1210.

The nonvolatile memory apparatuses 1220-0 to 1220-*n* may be used as storage media of the data storage device 1200. The nonvolatile memory apparatuses 1220-0 to 1220-*n* may be connected to the controller 1210 through a plurality of channels CH0 to CHn, respectively. One or more nonvolatile memory apparatuses may be connected to one channel. The nonvolatile memory apparatuses connected to one channel may be connected to substantially the same signal bus and data bus.

The power supply 1240 may provide power inputted through the power connector 1103 to the controller 1210, the nonvolatile memory apparatuses 1220-0 to 1220-*n*, and the buffer memory 1230 of the data storage device 1200. The power supply 1240 may include an auxiliary power supply 1241. The auxiliary power supply 1241 may supply power such that the data storage device 1200 may be normally terminated when a sudden power off occurs. The auxiliary power supply 1241 may include large-capacity capacitors; however, the present disclosure is not limited thereto.

It is clear that the signal connector 1101 may be configured as various types of connectors according to an interface method between the host 1100 and the data storage device 1200.

It is of course that the power connector 1103 may be configured as various types of connectors according to a power supply method of the host 1100.

Figure 10:
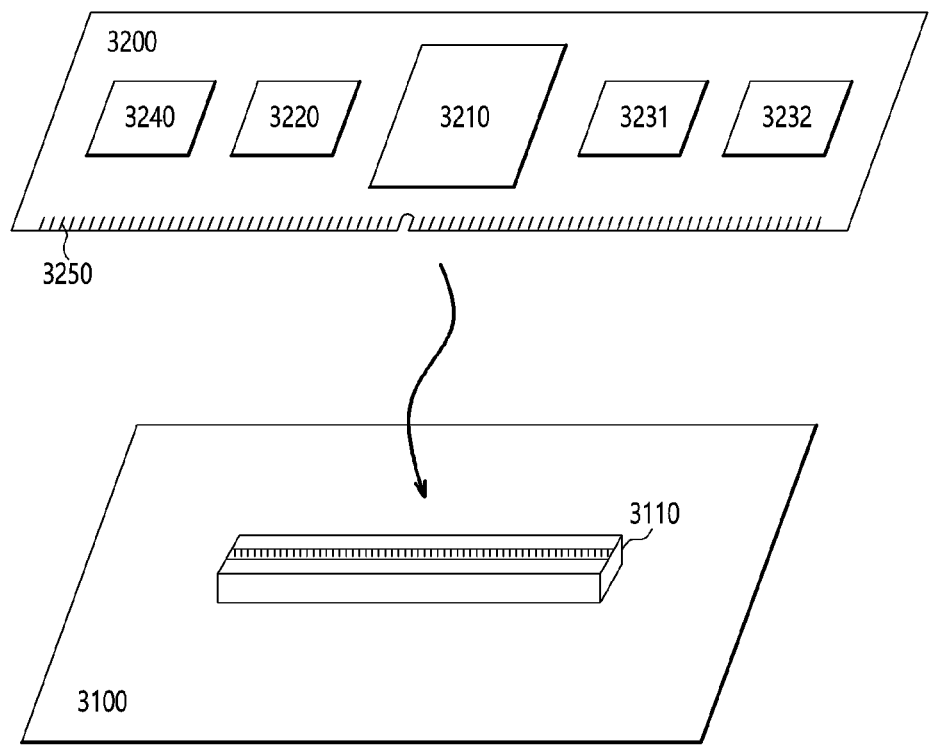
FIG. 10 illustrates an example of a data processing system based on an embodiment of the disclosed technology.
Figure 11:
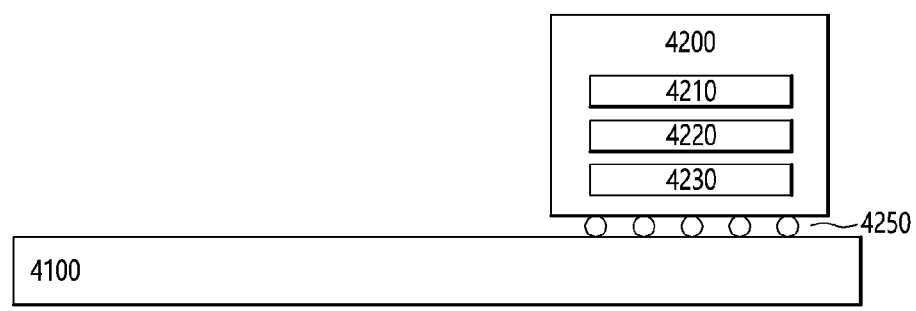
FIG. 11 illustrates an example of a data processing system based on an embodiment of the disclosed technology.

FIG. 10 and FIG. 11 are diagrams of data processing systems 3000 and 4000 based on some embodiments of the disclosed technology.

Referring to FIG. 10, the data processing system 3000 may include a host 3100 and a memory system 3200.

The host 3100 may be configured in the form of a board such as a printed circuit board. Although not illustrated, the host 3100 may include background functional blocks for performing the function thereof.

The host 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be called a memory module or a memory card. The memory system 3200 may include a controller 3210, a buffer memory 3220, nonvolatile memory apparatuses 3231 and 3232, a power management integrated circuit (PMIC) 3240, and a connection terminal 3250.

The controller 3210 may control the overall operation of the memory system 3200.

The controller 3210 may be configured in substantially the same manner as the controller 150 illustrated in FIG. 1 to FIG. 3.

The buffer memory 3220 may temporarily store data to be stored in the nonvolatile memory apparatuses 3231 and 3232. Furthermore, the buffer memory 3220 may temporarily store data read from the nonvolatile memory apparatuses 3231 and 3232. The data temporarily stored in the buffer memory 3220 may be transmitted to the host 3100 or the nonvolatile memory apparatuses 3231 and 3232 under the control of the controller 3210.

The nonvolatile memory apparatuses 3231 and 3232 may be used as storage media of the memory system 3200.

The PMIC 3240 may provide power, which is inputted through the connection terminal 3250, to the background of the memory system 3200. The PMIC 3240 may manage the power of the memory system 3200 under the control of the controller 3210.

The connection terminal 3250 may be electrically connected to the connection terminal 3110 of the host 3100. Signals such as commands, addresses, and data and power may be transferred between the host 3100 and the memory system 3200 through the connection terminal 3250. The connection terminal 3250 may be configured in various forms according to an interface method between the host 3100 and the memory system 3200. The connection terminal 3250 may be disposed on any one side of the memory system 3200.

FIG. 11 is a configuration diagram of the data processing system 4000 including a memory system in accordance with an embodiment.

Referring to FIG. 11, the data processing system 4000 may include a host 4100 and a memory system 4200.

The host 4100 may be configured in the form of a board such as a printed circuit board. Although not illustrated, the host 4100 may include background functional blocks for performing the function thereof.

The memory system 4200 may be configured in the form of a surface mount package. The memory system 4200 may be mounted on the host 4100 through a solder ball 4250. The memory system 4200 may include a controller 4210, a buffer memory 4220, and a nonvolatile memory apparatus 4230.

The controller 4210 may control the overall operation of the memory system 4200.

The buffer memory 4220 may temporarily store data to be stored in the nonvolatile memory apparatus 4230. Furthermore, the buffer memory 4220 may temporarily store data read from the nonvolatile memory apparatus 4230. The data temporarily stored in the buffer memory 4220 may be transmitted to the host 4100 or the nonvolatile memory apparatus 4230 under the control of the controller 4210.

The nonvolatile memory apparatus 4230 may be used as a storage medium of the memory system 4200.

Figure 12:
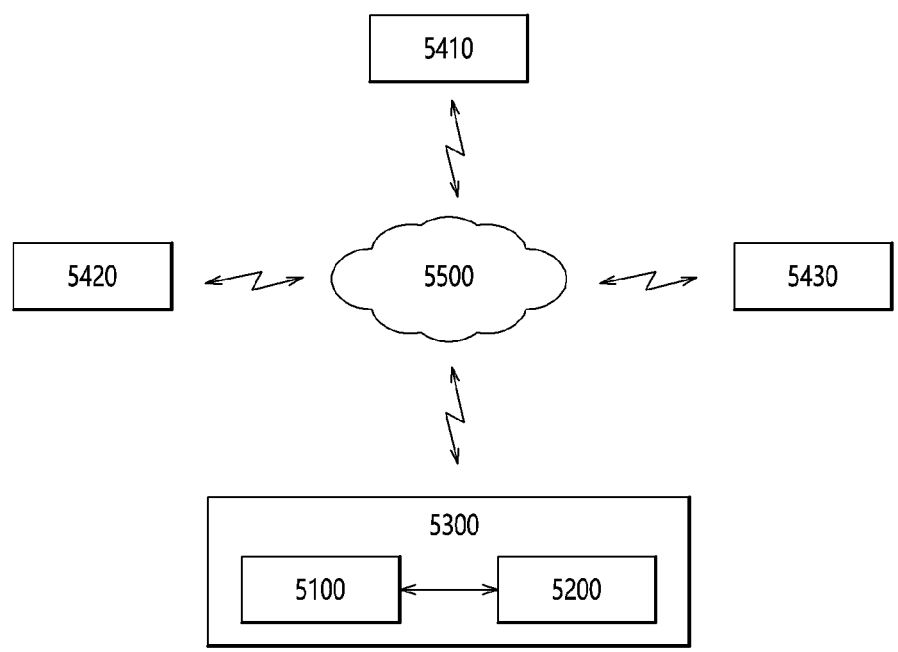
FIG. 12 is an example of a network system including the data storage device based on an embodiment of the disclosed technology.

FIG. 12 is an example of a network system 5000 including the data storage device based on an embodiment of the disclosed technology.

Referring to FIG. 12, the network system 5000 may include a server system 5300 and a plurality of client systems 5410, 5420, and 5430, which are electrically connected to each other through a network 5500.

The server system 5300 may service data in response to requests of the plurality of client systems 5410, 5420, and 5430. For example, the server system 5300 may store data provided from the plurality of client systems 5410, 5420, and 5430. As another example, the server system 5300 may provide data to the plurality of client systems 5410, 5420, and 5430.

The server system 5300 may include a host 5100 and a memory system 5200. The memory system 5200 may be configured as the data storage device 100 of FIG. 1, the data storage device 1200 of FIG. 9, the memory system 3200 of FIG. 10, or the memory system 4200 of FIG. 11.

Figure 13:
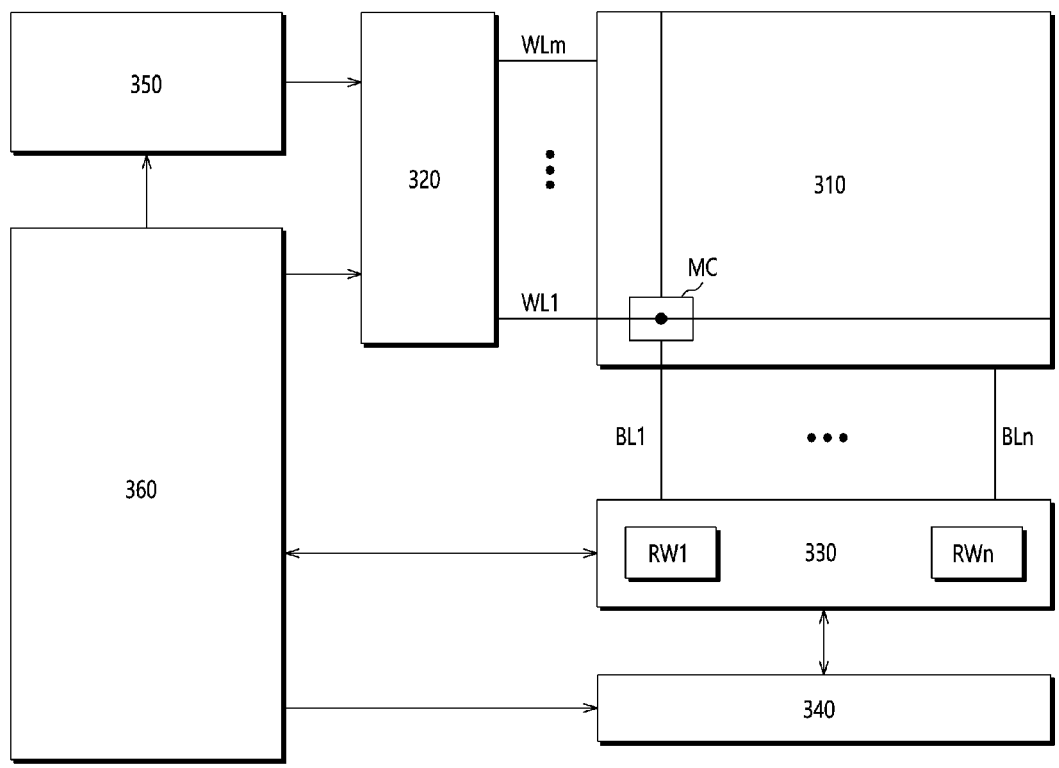
FIG. 13 is an example of a nonvolatile memory apparatus included in the data storage device based on an embodiment of the disclosed technology.

FIG. 13 an example of a nonvolatile memory apparatus 300 included in the data storage device based on an embodiment of the disclosed technology.

Referring to FIG. 13, the nonvolatile memory apparatus 300 may include a memory cell array 310, a row decoder 320, a data read/write block 330, a column decoder 340, a voltage generator 350, and a control logic 360.

The memory cell array 310 may include memory cells MC arranged in areas where word lines WL1 to WLm and bit lines BL1 to BLn cross each other.

The memory cell array 310 may include a three-dimensional memory array. The three-dimensional memory array has a vertical orientation with respect to a flat surface of a semiconductor substrate and refers to a structure including a NAND string in which at least one memory cell is located vertically above another memory cell. However, the structure of the three-dimensional memory array is not limited thereto and it is clear that the three-dimensional memory array can be selectively applied as long as it has a memory array structure formed with not only vertical orientation but also horizontal orientation with high integration.

The row decoder 320 may be connected to the memory cell array 310 through the word lines WL1 to WLm. The row decoder 320 may operate under the control of the control logic 360. The row decoder 320 may decode an address provided from an external device (not illustrated). The row decoder 320 may select and drive the word lines WL1 to WLm on the basis of the decoding result. For example, the row decoder 320 may provide the word lines WL1 to WLm with a word line voltage provided from the voltage generator 350.

The data read/write block 330 may be connected to the memory cell array 310 through the bit lines BL1 to BLn. The data read/write block 330 may include read/write circuits RW1 to RWn corresponding to the bit lines BL1 to BLn, respectively. The data read/write block 330 may operate under the control of the control logic 360. The data read/ write block 330 may operate as a write driver or a sense amplifier according to an operation mode. For example, the data read/write block 330 may operate as a write driver that stores data provided from the external device, in the memory cell array 310 during a write operation. As another example, the data read/write block 330 may operate as a sense amplifier that reads data from the memory cell array 310 during a read operation.

The column decoder 340 may operate under the control of the control logic 360. The column decoder 340 may decode the address provided from an external device. The column decoder 340 may connect the read/write circuits RW1 to RWn of the data read/write block 330, which correspond to the bit lines BL1 to BLn, respectively, to a data input/output line (or data input/output buffer) on the basis of the decoding result.

The voltage generator 350 may generate voltages used in the background operation of the nonvolatile memory apparatus 300. The voltages generated by the voltage generator 350 may be applied to the memory cells of the memory cell array 310. For example, a program voltage generated during a program operation may be applied to word lines of memory cells on which the program operation is to be performed. As another example, an erase voltage generated during an erase operation may be applied to a well-region of memory cells on which the erase operation is to be performed. As another example, a read voltage generated during a read operation may be applied to word lines of memory cells on which the read operation is to be performed.

The control logic 360 may control the overall operation of the nonvolatile memory apparatus 300 on the basis of a control signal provided from the external device. For example, the control logic 360 may control the read, write, and erase operations of the nonvolatile memory apparatus 300.

The technical features disclosed in this patent document can be implemented in various configurations or ways and the disclosed embodiments are merely examples of certain implementations. Various and enhancements of the disclosed embodiments and other embodiments can be made based on what is disclosed and/or illustrated in this patent document.

What is claimed is:

1. A data storage device comprising:
   a first memory apparatus including a plurality of data blocks having data classified in units of data blocks;
   a second memory apparatus in communication with the first memory apparatus to store data cached from the first memory apparatus; and
   a controller in communication with the first memory apparatus and the second memory apparatus and configured to control the first memory apparatus with respect to data stored in the first memory apparatus to be cached in the second memory apparatus in units of caching groups,
   wherein the controller is configured to perform a caching group based caching operation by controlling the first memory apparatus to cache data from the first memory apparatus to the second memory apparatus on a caching group basis, and each caching group includes a first data block requested for caching and one or more other data blocks having the same write count as a write count of the first data block,
   wherein a write count for each of the plurality of data blocks is checked and changed continuously whenever a data write occurs in the first memory apparatus.

2. The data storage device according to claim 1, wherein the controller checks the write count of each of the plurality of data blocks, sets, as first bit values, bit values corresponding to start positions of consecutive data blocks having the same write count as each other, in a bitmap having the same size as the number of the plurality of data blocks, and determines intervals between the first bit values of the bitmap as a size of a caching group.

3. The data storage device according to claim 2, wherein the controller checks the write count of each of the plurality of data blocks in the first memory apparatus, changes a bit value corresponding to a second data block to the first bit value when a write count of the second data block is different from a write count of a third data block immediately preceding the second data block, in the write count checked data blocks, and forms the caching group including data blocks that are consecutively arranged from a data block corresponding to the first bit value and having the same write count.

4. The data storage device according to claim 3, wherein the controller sets an initial bitmap by setting a bit value corresponding to the first data block of the plurality of data blocks, to 0, and setting, to zero, bit values corresponding to data blocks from the second data block to a last data block, and
   wherein, upon changing the bit value, the controller changes a bit value for each of the plurality of data blocks based on the initial bitmap.

5. The data storage device according to claim 2, wherein the controller forms a plurality of caching groups based on the first bit value, and caches data, to the second memory apparatus, from a caching group that includes a first data block requested for caching.

6. The data storage device according to claim 5, wherein the controller generates a caching group information list including at least one write count for each caching group, a size of each caching group, and starting block information of each caching group.

7. The data storage device according to claim 2, wherein the controller forms a plurality of caching groups based on the first bit value, selects a caching group that includes a first data block requested for caching, from the plurality of caching groups, in the order of the write count from highest to lowest, and controls data in the selected caching group to be cached in the second memory apparatus.

8. The data storage device according to claim 1, wherein the controller generates a mapping table by caching data in the caching group to the second memory apparatus and matching logical addresses for the cached data, a physical address of the first memory apparatus, and a physical address of the second memory apparatus.

9. The data storage device according to claim 8, wherein, upon receipt of a read command from a host, the controller searches for the mapping table by using a logical address included in the read command, and checks whether the caching operations has been performed based on whether there exists the physical address of the second memory apparatus matching the logical address as a result of the search, and
   wherein, when the physical address of the second memory apparatus matching the logical address exists in the mapping table, the controller acquires data corresponding to the physical address of the second memory apparatus from the second memory apparatus, and returns the acquired data to the host on a caching group basis.

10. The data storage device according to claim 1, wherein, when a remaining memory space of the second memory apparatus is equal to or less than a reference value, the controller evicts data stored in the second memory apparatus, selects a caching group in the first memory apparatus having the same size as a size of the evicted data, and caches data of the selected caching group to the second memory apparatus.

11. A method for operating a data storage device, the method comprising:
checking a write count of each of a plurality of data blocks in a first memory apparatus;
setting, as a first bit value, a bit value corresponding to each start position of consecutive data blocks having the same write count as each other, in a bitmap having the same size as the number of the plurality of data blocks;
forming a plurality of caching groups each including one or more data blocks by using the first bit value; and
caching data stored in the first memory apparatus to a second memory apparatus on a caching group basis, each including a first data block requested for caching and one or more data blocks having the same write count as a write count of the first data block, among the plurality of caching groups.

12. The method according to claim 11, wherein the setting of the bit value as the first bit value comprises:
checking whether a write count of a second data block is identical to a write count of a third data block as an immediately preceding data block of the second data block in the plurality of data blocks; and
changing a bit value corresponding to the third data block to the first bit value when the write count of the second data block is different from the write count of the third data block,
wherein, upon determining the plurality of caching groups, the caching group is formed to include data blocks that are consecutively arranged from a data block corresponding to the first bit value in the plurality of data blocks and having the same write count.

13. The method according to claim 12, wherein the setting of the bit value as the first bit value further comprises:
setting, to one, an initial bitmap by setting a bit value corresponding to the first data block of the plurality of data blocks, and setting, to zero, bit values corresponding to the second data block to a last data block of the plurality of data blocks,
wherein, upon changing the bit value of the second data block, a bit value for the second data block is changed in each of the plurality of data blocks based on the initial bitmap.

14. The method according to claim 11, further comprising:
before caching the data to the second memory apparatus after forming the plurality of caching groups, selecting a caching group to be cached, wherein the caching group includes the first data block requested for caching, from the plurality of caching groups, in the order of the write count from highest to lowest.

15. The method according to claim 11, further comprising:
after forming the plurality of caching groups, generating a caching group information list including at least one write count for each caching group, a size of each caching group, and starting block information of each caching group.

16. The method according to claim 11, further comprising:
after caching the caching group to the second memory apparatus, generating a mapping table by matching logical addresses for the cached data, a physical address of the first memory apparatus, and a physical address of the second memory apparatus.

17. The method according to claim 16, further comprising:
after caching the caching group to the second memory apparatus, searching for the mapping table by using a logical address included in a read command upon receipt of the read command from a host;
checking whether caching has been performed based on whether there exists the physical address of the second memory apparatus matching the logical address as a result of the search;
acquiring data corresponding to the physical address of the second memory apparatus, from the second memory apparatus when the physical address of the second memory apparatus matching the logical address exists in the mapping table; and
returning the acquired data to the host,
wherein the data are returned to the host on a caching group basis.

18. The method according to claim 11, further comprising:
after the step of caching the caching group to the second memory apparatus, evicting data stored in the second memory apparatus when a remaining memory space of the second memory apparatus is equal to or less than a reference value;
selecting a caching group in the first memory apparatus having the same size as a size of the evicted data; and
caching data of the selected caching group to the second memory apparatus.

19. A data storage device comprising:
a first memory apparatus configured to group data into data blocks to store the data on a data block basis;
a second memory apparatus in communication with the first memory apparatus to store data cached from the first memory apparatus; and
a controller in communication with the first memory apparatus and the second memory apparatus and configured to:
check a write count of each of a plurality of data blocks in the first memory apparatus;
form a plurality of caching groups each including consecutive data blocks having the same write count as each other as a result of the check;
select a caching group to be cached from the plurality of formed caching groups in the order of the write count from highest to lowest; and
control data in the selected caching group to be cached in the second memory apparatus,
wherein a size of each of the plurality of caching groups is larger than or equal to a size of a single data block.

20. The data storage device according to claim 19, wherein the controller is further configured to:
check a write count of each of the plurality of data blocks the first memory apparatus;
set, as a first bit value, a bit value corresponding to each start position of consecutive data blocks having the same write count as each other, in a bitmap having the same size as the number of the plurality of data blocks; and form the plurality of caching groups each including one or more data blocks by using the first bit value.

\* \* \* \* \*